Figure 1:
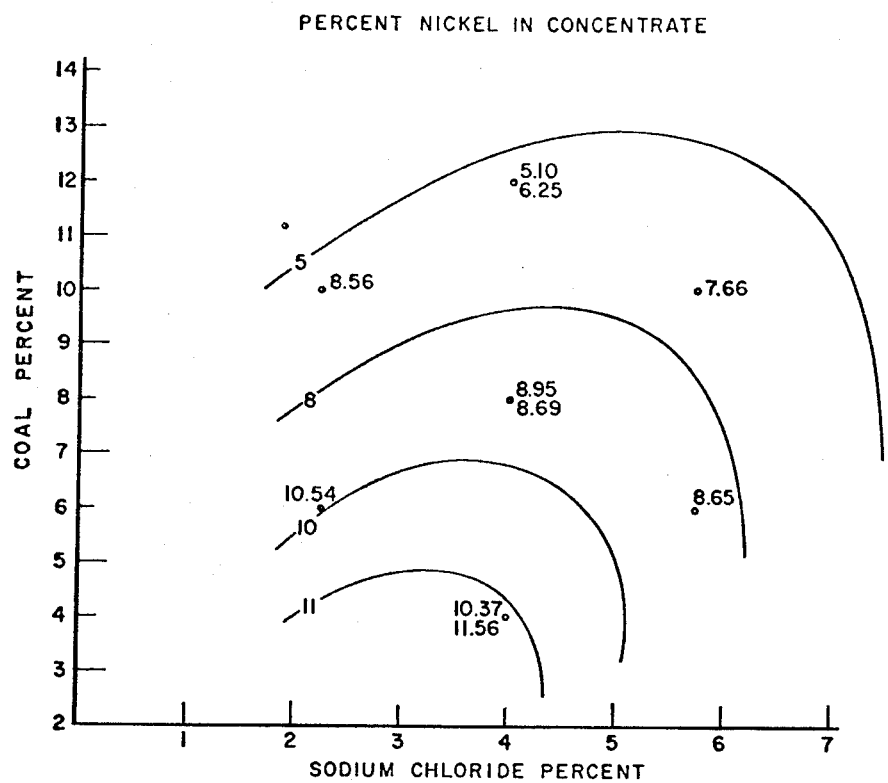

United States Patent [19]

Iwasaki

[11] 3,754,896

[45] Aug. 28, 1973

[54] PROCESS FOR RECOVERING NICKEL FROM VERY LOW GRADE PRIMARY NICKEL ORES

[75] Inventor: Iwao Iwasaki, Minneapolis, Minn.

[73] Assignee: The Regents of the University of Minnesota, Minneapolis, Minn.

[22] Filed: Aug. 11, 1970

[21] Appl. No.: 62,837

[52] U.S. Cl. ................. 75/82, 75/119, 423/152
[51] Int. Cl. ................. C22b 23/00, C22b 3/00
[58] Field of Search .............. 75/82, 119, 128 R, 75/111; 423/152

[56] References Cited
UNITED STATES PATENTS
1,487,145  3/1924  Caron .................................. 75/82
3,453,101  7/1969  Takahashi et al. .................. 75/119

FOREIGN PATENTS OR APPLICATIONS
1,064,469  4/1967  Great Britain ...................... 75/82

Primary Examiner—Oscar R. Vertiz
Assistant Examiner—Hoke S. Miller
Attorney—Kenyon and Kenyon Reilly Carr and Chapin

[57] ABSTRACT

A process for recovering nickel from primary rock materials with a very low nickel content characterized by massive occurrences therein of a relatively uniform and very low grade of nickel in the form of sulphides, oxides, alloys and silicates, very low sulphur and low copper and iron values, low sulphur to nickel ratios and the absence or negligible occurrences of pyrrhotite. The process comprises the grinding of the rock materials to fine particles, adding sodium chloride or other alkali metal chlorides and coal, by itself or in combination with other carbonaceous reducing agents, roasting the resulting mixture in a near neutral atmosphere at temperatures from 800° to 1100°C. for a sufficient time to effect conversion of a substantial amount of the nickel content to nickel in metallic, alloy or oxide forms, cooling the resulting mixture under non-atmospheric conditions to a non-reacting temperature and removing the magnetic fraction from the roasted mixture by magnetic separation procedures.

10 Claims, 2 Drawing Figures

PROCESS FOR RECOVERING NICKEL FROM VERY LOW GRADE PRIMARY NICKEL ORES

This invention relates to the recovery of nickel in beneficial concentrates from very low-grade primary nickel ores. These primary ores are characterized by very low nickel values and low sulphur, iron and copper contents, with the nickel in the form of various compounds intimately dispersed throughout in fine particles (down to micron size). The invention comprises a method of causing the nickel in these fine particles to change to a metallic or oxide state and to agglomerate into larger particles which thereby become amenable to separation and concentration by various magnetic means.

It is known in the art that the commerically significant nickel deposits are classified into two main types: (i) sulphides which are primary nickel ores and (ii) laterites and garnierites which are secondary nickel ores.

i. Nickel-bearing sulphide ores are normally concentrated by flotation to produce a copper-nickel concentrate, or in rare cases only a nickel concentrate, generally containing some 5 to 10 percent nickel. These concentrates are smelted either in a reverbatory or blast furnace to produce a matte for further refining. In some cases these concentrates may be processed by leaching. Sulphide ores being commercially treated at the present time generally contain more than 1 percent nickel. However, in some cases where the flotation process is particularly satisfactory and where other recoverable metal values are present, ores with nickel grades down to the range of 0.75 percent are processed for nickel.

ii. Nickel-bearing laterites and garnierites result from the deterioration of primary rock materials through weathering, erosion and related chemical and physical processes during which the nickel values are concentrated many times compared with the primary rock material and are deposited in layers of altered and relatively soft residual rock materials. Hence these are known as "secondary" ores or rock materials. Because there are no known applicable physical ore dressing techniques, laterites and garnierite ores are directly treated either by blast furnace smelting, the Krupp-Renn process or by leaching with either ammonia or sulphuric acid.

Nickel-bearing laterites and garnierites which are subject to commercial exploitation normally contain from 1.5 to 3 percent nickel.

Primary rock materials (as distinguished from secondary rock materials) with very low nickel contents (i.e., below about 0.5 percent, herein generically referred to as "very low-grade" primary nickel rock materials or ores) are found in various Precambrian and Cordillera regions in Canada and Alaska and in other regions of the world including Northern Europe, Asia, Australia and various tropical and subtropical areas. In Canada, very low-grade primary nickel rock materials of interest for exploitation with the invention herein described are characteristically found in the form of peridotite or other ultramafic rock formations. These formations represent vast amounts of nickel and it is apparent that development of a commercially feasible process to recover nickel on a large scale at low cost from these rock materials would make available vast new quantities of nickel previously unavailable in Canada and elsewhere. The very low nickel grades and the tonnage potential of the foregoing primary rock formations have been known and studied in Canada and elsewhere for many years, but no known mineral processing art has been applied, and no new process has been developed, which successfully extracts the nickel values on a commercial basis.

Several known techniques were used in an effort to obtain a satisfactory nickel concentrate from the vary low-grade nickel peridotites. For example, the most advanced techniques of froth flotation were applied to attempt to extract the nickel values. However, nickel recoveries in suitable concentrates did not generally exceed 50 percent. Examples of the results from these tests are set forth below:

FLOTATION EXAMPLES

Tests on a variety of samples of very low-grade primary ores showed that flotation produced low-grade concentrates with generally less than 5 percent nickel and nickel recoveries of less than 50 percent with some exceptions. The following will illustrate the inadequate response of these very low-grade nickel ores to flotation.

Two samples of very low-grade nickel peridotite ore from surface pits were tested at two different grinds in an attempt to produce a marketable nickel concentrate. The flotation procedure consisted of adjusting the pH of the pulp to between 6 and 8.5 using 10 percent sulphuric acid conditioning with 0.2 lbs. of Z-6 (Dow Chemical Co. potassium amyl xanthate) per ton for 3 minutes and with two drops of either pine oil or Aerofroth (American Cyanamid — higher alcohol frother) for 1 minute; followed by aerating and roughing for 5 minutes. When the feed was ground for 20 minutes, the rougher concentrate was cleaned once at pH 3.5 for 3 minutes. When the feed was ground for 40 minutes, the rougher concentrate was cleaned twice. During the second cleaning, 0.03 lbs. of Z-6 per ton and an additional drop of frother was added and floated for 1 minute. The pH was maintained at 3.5. The grinding of the samples may be described as follows:

| Sample No. | % Ni Crude | Test No. | Grind (minutes) | % 400 Mesh |
|---|---|---|---|---|
| 1 | 0.31 | 1 | 20 | 42.76 |
| 1 | 0.31 | 2 | 20 | 42.76 |
| 1 | 0.31 | 3 | 40 | 89.25 |
| 2 | 0.28 | 4 | 20 | 46.68 |
| 2 | 0.28 | 5 | 40 | 90.46 |

The results of the five flotation tests as denominated above are summarized below:

RELATION OF GRIND AND SAMPLE TYPE TO NICKEL RECOVERY BY FLOTATION

| Test No. | Product | % Weight | % Ni | % Cu | % Dist Ni |
|---|---|---|---|---|---|
| 1. | Cleaner concentrate | 5.52 | 0.95 | 0.03 | 14.40 |
|    | Cleaner tailing | 5.57 | 0.43 | 0.04 | 6.65 |
|    | Rougher tailing | 88.91 | 0.32 | 0.04 | 78.95 |
| 2. | Cleaner concentrate | 6.42 | 0.76 | 0.03 | 16.67 |
|    | Cleaner tailing | 3.89 | 0.32 | 0.04 | 4.08 |
|    | Rougher tailing | 89.69 | 0.26 | 0.05 | 79.25 |
| 3. | 2nd Cleaner concen. | 1.56 | 2.54 | 0.04 | 14.34 |
|    | 2nd Cleaner tailing | 2.40 | 0.35 | 0.04 | 2.87 |
|    | 1st Cleaner tailing | 5.11 | 0.26 | 0.04 | 4.66 |
|    | Rougher tailing | 90.93 | 0.24 | 0.03 | 78.13 |
| 4. | Cleaner concentrate | 4.89 | 1.10 | 0.02 | 17.25 |
|    | Cleaner tailing | 4.73 | 0.31 | 0.05 | 4.79 |
|    | Rougher tailing | 90.38 | 0.27 | 0.04 | 77.96 |
| 5. | 2nd Cleaner concen. | 1.35 | 3.85 | 0.04 | 17.57 |
|    | 2nd Cleaner tailing | 1.77 | 0.52 | 0.03 | 3.04 |
|    | 1st Cleaner tailing | 5.37 | 0.27 | 0.04 | 5.07 |
|    | Rougher tailing | 91.51 | 0.24 | 0.05 | 74.32 |

With such low recoveries and large expense associated with the grinding and flotation processes used, large-scale application of the flotation process does not appear commercially feasible.

Similarly, numerous leaching tests conducted on such peridotite materials using all of the known leaching reagents for nickel as well as experimenting with new reagents with a view to recovery of the nickel values in the resulting leach liquors indicated that nickel recoveries could not be obtained within a commerical framework.

Further, a large number of tests were conducted on the foregoing nickel peridotite materials in attempting to separate the nickel values from the material by various magnetic means. Magnetic separation was attempted at several magnetic intensities and by grinding to and screening at several different particle sizes. Examples of the results obtained from these tests are set forth below:

MAGNETIC SEPARATION EXAMPLES

The nickel in various samples of very low-grade primary nickel peridotite ores at various grinds and magnetic intensities could not be appreciably upgraded by magnetic separation.

Example 1

| Product | % Wt | % Ni | Ni Recovery |
|---|---|---|---|
| Magnetic Concentrate | 0.3 | 0.13 | 0.2 |
| Non-magnetics | 99.7 | 0.24 | 99.8 |
| Heads (Calculated) |  | 0.24 | 100.0 |

Example 2

| | Samples B-1 | | | | Samples B-2 | | |
|---|---|---|---|---|---|---|---|
| | % Wt | % Fe | % Ni | Ni Recovery | % Wt | % Fe | % Ni | Ni Recovery |
| Magnetic Concentrate | 12.0 | 18.6 | 0.33 | 13.1 | 9.3 | 21.6 | .25 | 8.0 |
| Heads | | | 0.30 | | | | .29 | |

In addition, gravity separation tests were run on these ores. NOne of the nickel recoveries in the concentrates so obtained nor the grades of nickel in the concentrates were considered remotely indicative of recovery on a commerical basis.

However, as described below, the process of the present invention has been successfully practiced on these peridotite materials and other vary low-grade primary nickel rock materials and provides a very beneficial method for extracting nickel values for the first time.

THE PRESENT INVENTION

Briefly, in accordance with the present invention, the extraction of nickel values is accomplished by the following process. The very low-grade primary nickel ore is ground and then intermixed with an alkali metal chloride, such as sodium chloride, and with coal by itself or in combination with one or more other carbonaceous reducing agents. For the alkali metal chloride, unrefined raw sodium chloride is particularly suitable. The coal can be of any variety including anthracite and bituminous or sub-bituminous coal as well as materials which are relatively low in carbon content and high in volatile materials such as lignite, bentonite and peat. (Such coals, lignite, bentonite and peat are herein collectively referred to as "coal"). Coke, charcoal and crude petroleum are carbonaceous reducing agents suitable for use in combination with coal. The mixture of ground ore, sodium chloride and coal is roasted at an elevated temperature ranging from about 800° to 1,100° C. in a near neutral atmosphere until a substantial portion of the nickel has been converted to metallic, alloy and oxide forms. The roasted or calcined mixture is then cooled in the same atmosphere or by water quenching. By first cooling the calcined mixture in the same atmosphere and then using water quenching and by varying the temperature at which the atmosphere cooling is terminated and the water quenching is initiated, recoveries and grades of nickel in the concentrate can be controlled and optimized for different ores. The calcined mixture is then either subjected directly to magnetic separation procedures or is ground and treated by magnetic separation or is treated by various combinations and sequences of grinding and magnetic separation. The nickel recovered in the magnetic portion of the mixture is sufficient in amount and grade to make the process feasible.

As previously indicated, this invention has been practiced on very low-grade Canadian nickel peridotite ores which may contain varying degrees of serpentinization. In such periodotite ores the nickel is present as sulphides, oxides, silicates, alloys and to a minor degree in arsenides. The nickel sulphide minerals are primarily millerite and pentlandite but also may include siegenite, violarite, heazlewoodite, polydymite and gersdorffite. Iron-nickel alloys such as awaurite may also be present. Other minerals generally found in such peridotite ores are serpentine (chiefly as antigorite), talc, magnetite, dolomite and chromite. The nickel content of such peridotite ores is relatively constant generally falling in the range of from 0.2 to 0.35 percent, a range which has not heretofore been commercially exploitable, due to the low nickel recoveries obtainable by conventional means as previously described.

Such peridotite ores are further characterized by very low sulphur, low iron (1 to 10 percent but generally less than 7 percent) and low copper contents, by low sulphur to nickel ratio (generally less than 1), and by containing little or no pyrrhotite, in contrast with normal nickel sulphide ores in Canada and elsewhere. To indicate the low ratio of sulphur to nickel in such peridotite ores, Table I sets forth the analysis of samples of peridotite ores at three different locations.

TABLE I

| | Location A | | Location B | | Location C | |
|---|---|---|---|---|---|---|
| % Ni | 0.30 | 0.29 | 0.25 | 0.27 | 0.24 | 0.25 |
| % S | 0.14 | 0.09 | 0.08 | 0.15 | 0.14 | 0.08 |
| S:Ni Ratio | 0.47 | 0.31 | 0.32 | 0.56 | 0.58 | 0.32 |

The low iron and low copper contents of such peridotite ores as well as the low sulphur content are indicated in the analyses in Table II.

TABLE II

| | Sample 1 | Sample 2 | Sample 3 |
|---|---|---|---|
| % Ni | 0.27% | 0.30% | 0.29 |
| % Fe | 5.20 | 5.43 | 5.65 |
| % Cu | 0.04 | 0.018 | 0.018 |
| % S | 0.15 | 0.138 | 0.090 |

Other significant materials in the above samples were MgO (approximately 34 percent in sample 1) and $SiO_2$ (approximately 35 percent in sample 1).

The mineralogical composition of such peridotite ores as reflected in two samples are set forth in Table III.

TABLE III

| Mineral | Sample 1 | Sample 2 |
|---|---|---|
| Antigorite | 73.2% | 77.6% |
| Talc | 8.9 | 6.8 |
| Carbonate | 9.0 | 8.8 |
| Oxides | 8.5 | 6.5 |
| Sulphides | 0.4 | 0.3 |

The nickel sulphides contained in such peridotite ores occur either as separate grains unassociated with other sulphides such as pyrite or may form large composite grains in association with magnetite, pyrite and gersdorffite. The relative abundance of the different minerals contained in several samples of such peridotite ores is set forth in TABLE IV.

TABLE IV.—RELATIVE MINERAL ABUNDANCE*

| | Percent volume | | | | | | | | | |
|---|---|---|---|---|---|---|---|---|---|---|
| Sample | Serp. | Dol. | Chr. | Mag. | Py. | Sieg. | Mill. | Pent. | Gd. | Ccp. |
| 1 | 73.4 | 24.9 | 0.1 | 1.4 | 0.2 | Tr. | Tr. | Tr. | Tr. | Tr. |
| 2 | 89.4 | 9.2 | 0.2 | 0.5 | 0.5 | 0.1 | | 0.1 | Tr. | |
| 3 | 70.9 | 27.7 | 0.7 | 0.2 | | Tr. | 0.5 | Tr. | | |
| 4 | 86.6 | 7.2 | 1.3 | 4.9 | Tr. | | Tr. | Tr. | | |
| 5 | 82.9 | 14.7 | 0.1 | 1.3 | Tr. | 0.3 | 0.7 | | | |
| 6 | 80.4 | 16.1 | 0.4 | 1.9 | | 0.1 | 1.1 | Tr. | | |
| 7 | 87.8 | 7.2 | 0.4 | 2.8 | 0.2 | 1.0 | | 0.6 | | |
| 8 | 83.0 | 6.8 | 7.4 | 2.8 | | | | | | |
| 9 | 63.5 | 31.7 | 1.1 | 3.7 | | | | | | |
| 10 | 83.6 | 12.0 | 0.8 | 2.0 | | 0.3 | 1.3 | Tr. | | |

Tr.=trace=<0.1%; Serp.=serpentine; Dol.=dolomite; Chr.=chromite; Mag.=magnetite Py.=pyrite; Sieg.=siegenite; Mill.=millerite; Pent.=pentlandite; Gd.=gersdorffite Ccp.=chalcopyrite.

The chemical constituents found in the minerals in TABLE IV are set forth in TABLE V below.

TABLE V

| | % Fe | % Ni | % Co | % S | % As |
|---|---|---|---|---|---|
| Serpentine | n.d | 0.09 | n.d. | n.d. | n.d. |
| Millerite | 0.97 | 63.24 | 0.52 | 34.08 | n.d. |
| Pentlandite | 24.88 | 44.12 | 0.74 | 32.00 | n.d. |
| Siegenite | 1.48 | 33.97 | 23.78 | 42.56 | n.d. |
| Gersdorffite | 2.13 | 10.52 | 24.06 | 20.32 | 43.87 |
| Pyrite | 45.74 | 0.38 | 0.66 | 53.14 | 0.20 | n.d. = not detected

The amount of nickel in the sulphides and the serpentine is variable from sample to sample in the same area and from ore deposit to ore deposit through the over-all grade of nickel in the very low-grade peridotite ores remains relatively constant.

In accordance with the present invention, the very low-grade primary nickel ore is first ground in a conventional crusher and possibly a mill to particles of a relatively fine size, such as from −20 to −50 mesh. The ground ore is then combined with coal, by itself or in combination with one or more other carbonaceous reducing agents (such as coke or charcoal) and sodium chloride or other alkali metal chloride. The amount of coal, or combination of coal and other carbonaceous reducing agent, required for the practice of this invention should generally be less than 6 percent of the weight of the ore processed (but may be between ½ of 1 percent and 14 percent) and should be of a particle size ranging preferably from −20 to −60 mesh. The amount of sodium chloride or other alkali metal chloride required to practice this invention should also preferably be less than 5 percent of the weight of the ore being processed (but may be between ¾% and 10 percent). The sodium chloride or other alkali metal chloride may also be introduced into the mixture in whole or in part in a water solution. The amounts and particle sizes of the ore, the coal, by itself or in combination with another carbonaceous reductant, and the sodium chloride or other alkali metal chloride may be varied for different types of ores as required to optimize recovery.

The mixture of ground ore, coal or coal in combination with other carbonaceous reductants and sodium chloride or other alkali metal chloride is then roasted in a near neutral atmosphere at an elevated temperature normally above 800° C. but less than 1,100° C. for from 20 minutes to 1½ hours. The roasting temperature and times can be varied for different types of ores as required to optimize recovery.

Water, crude oil or other volatile material may be introduced in order to provide an extra source of hydrogen to assist the process. These substances may be introduced in varying amounts at varying points during the roasting cycle. Water may also be introduced in solution with sodium chloride (or other alkali metal chloride) as previously described.

After the mixture has been roasted, it may be (a) cooled in a near neutral atmosphere, (b) introduced immediately without exposure to normal atmospheric conditions into water for quenching and cooling or (c) initially cooled in a near neutral atmosphere and then immediately introduced into water for further cooling and quenching without intervening exposure to normal atmospheric conditions. With respect to alternative (c), the amount of recovery of magnetic material from the ore (as described below) together with the amount and grade of nickel recovered in the magnetic concentrate may be influenced and optimized by varying the temperature of the ore at which the initial cooling thereof in the near neutral atmosphere is terminated and the cooling and quenching in water is commenced.

The ore which has been roasted and cooled by either method (a), (b) or (c) above is either (i) subjected to a minimum or no further grinding and then to magnetic separation procedures with the application of relatively high intensity magnetic fields or (ii) subjected to substantial further grinding and then subjected to magnetic separation procedures with the application of relatively lower intensity magnetic fields. In both cases a rough magnetic concentrate (and a tailing) is produced which may be upgraded and cleaned by repassing the same and resulting cleaner concentrates any number of times or by further grinding the same and by applying additional magnetic separation procedures with varying field strengths, all along lines well known in the art of magnetic separation. Normally the grinding and magnetic treatment of the roasted and cooled ore herein described would be accomplished in a water medium. An alkali, such as lime, soda ash, caustic soda, etc. or sodium sulphide, may be added to the roasted ore in varying quantities prior to initial grinding when necessary to prevent the nickel values therein from dissolving into the water. By processing very low-grade primary nickel rock materials in accordance with the teachings of this invention, a sufficient nickel recovery in the magnetic concentrate with a sufficient grade of nickel in the concentrate can be obtained to make it commercially feasible for the first time to process such materials.

Table VI sets forth the results of eleven tests conducted on samples of very low-grade Canadian primary nickel peridotite ores (generally of the types analyzed in Tables I through V) utilizing the process which comprises this invention. In each test, the roasting charge, consisting of the ground ore material, coal (by itself or in combination with coke) and sodium chloride, was pre-mixed and placed into a quartz tube crucible which was then heated in a vertical tube furnace. The heating rate was about 10° C. per minute until the foregoing temperature had been reached and thereafter the temperature was held constant for the one-hour residence time. A nitrogen atmosphere was maintained during the roasting period and after roasting during the period in which the calcined charge cooled to a non-reactive temperature. The cooled charge was then ground for twenty minutes in a water medium and subsequently subjected to magnetic separation procedures using a combination of Schulz and Davis magnetic tubes. Sodium sulphide was added with the water to the cooled charge to prevent any dissolving of the nickel in the water during grinding and magnetic separation. Rougher nickel concentrates and tailings were repassed several times through the magnetic separators and the two final products from the repassing of the combined concentrates and scavenger concentrates were a concentrate and middling, the analyses of which appear in Table VI.

TABLE VI

| Test No. | NaCl, percent by weight | Bituminous coal, percent by weight | Product | Percent wt. | Percent Ni | Ni dist. |
|---|---|---|---|---|---|---|
| 1 | 4 | 12 | Conc. | 3.71 | 5.10 | 77.78 |
|  |  |  | Mid. | 6.19 | 0.13 | 3.20 |
|  |  |  | Tail. | 90.00 | 0.045 | 18.93 |
| 2 | 5.732 | 10 | Conc. | 2.66 | 7.66 | 73.38 |
|  |  |  | Mid. | 8.61 | 0.21 | 6.48 |
|  |  |  | Tail. | 88.73 | 0.057 | 20.14 |
| 3 | 5.732 | 6 | Conc. | 2.43 | 8.63 | 78.65 |
|  |  |  | Mid. | 6.21 | 0.16 | 3.75 |
|  |  |  | Tail. | 91.36 | 0.051 | 17.60 |
| 4 | 4.0 | 4 | Conc. | 1.82 | 10.87 | 74.91 |
|  |  |  | Mid. | 3.24 | 0.26 | 3.04 |
|  |  |  | Tail. | 94.94 | 0.061 | 22.05 |
| 5 | 2.268 | 6 | Conc. | 2.00 | 10.54 | 81.15 |
|  |  |  | Mid. | 8.43 | 0.11 | 3.46 |
|  |  |  | Tail. | 89.57 | 0.045 | 15.39 |
| 6 | 2.268 | 10 | Conc. | 2.49 | 8.56 | 87.30 |
|  |  |  | Mid. | 10.85 | 0.089 | 4.10 |
|  |  |  | Tail. | 86.66 | 0.024 | 8.60 |
| 7 | 4.0 | 8 | Conc. | 2.36 | 8.95 | 70.33 |
|  |  |  | Mid. | 8.02 | 0.14 | 3.67 |
|  |  |  | Tail. | 89.62 | 0.087 | 26.00 |
| 8 | 4.0 | 8 | Conc. | 2.44 | 8.59 | 72.92 |
|  |  |  | Mid. | 8.44 | 0.128 | 3.82 |
|  |  |  | Tail. | 89.12 | 0.075 | 23.26 |
| 9 | 4.0 | 12 | Conc. | 3.33 | 6.25 | 77.90 |
|  |  |  | Mid. | 13.35 | 0.114 | 5.62 |
|  |  |  | Tail. | 83.32 | 0.053 | 16.48 |
| 10 | 4.0 | 4 | Conc. | 1.49 | 11.56 | 78.54 |
|  |  |  | Mid. | 4.84 | 0.18 | 4.11 |
|  |  |  | Tail. | 93.67 | 0.041 | 17.35 |
| 11 | 4.0 | *5-5 | Conc. | 2.60 | 8.08 | 84.68 |
|  |  |  | Mid. | 12.74 | 0.13 | 6.85 |
|  |  |  | Tail. | 84.66 | 0.025 | 8.47 |

* 5% petroleum coke used together with 5% bituminous coal.

Figure 2:
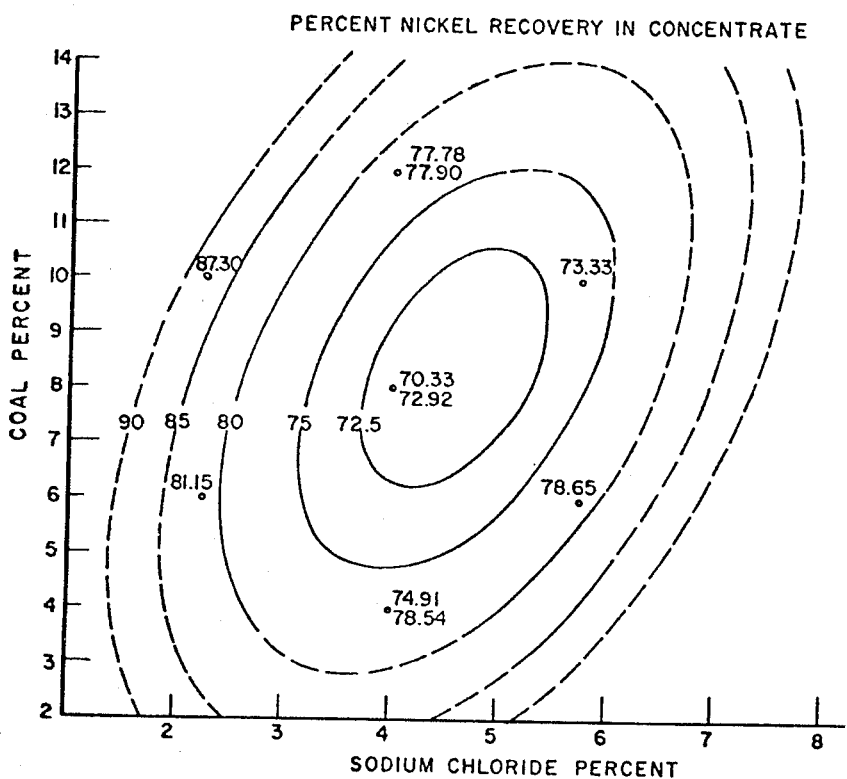

The above test results have been fitted with a second order regression equation by the method of least squares and the response contours have been obtained using a digital computer. These have been plotted in FIG. 1 to graphically illustrate how the percent by weight of sodium chloride and of coal used in the practice of the invention may be varied to increase the percentage grade of nickel in the magnetic concentrate recovered. Similarly response contours have been obtained and plotted in FIG. 2 to graphically illustrate how the percent of sodium chloride and of coal in the practice of the invention may be varied to increase the percent of nickel in the original ore which is recovered in the magnetic concentrate. Accordingly, by utilizing the information of the type depicted in both FIGS. 1 and 2, both the grade and recovery of nickel in the magnetic concentrate may be optimized.

One of the important effects of the practice of this invention is the very substantial increase in the ratio of nickel to iron in the magnetic concentrate obtained compared with such ratio in the ore prior to the application of the invention. To illustrate, in Table II, sample 1, above, the nickel content of the peridotite ore analyzed therein is 0.27 percent compared with an iron content of 5.2 percent, indicating a ratio of nickel to iron of approximately 1 to 20. In Table VI above, where the results of practising the invention are set forth, it is apparent that in several tests the grades of nickel in the concentrate exceed 10 percent and the average of the grades of nickel in concentrate reported is approximately 8 percent. Since the magnetic concentrate is expected not to contain iron in grades exceeding 50 percent, the average nickel to iron ratio in the concentrate would be at least 8 to 50 percent or approximately 1 to 6, representing more than a 300 percent increase in the ratio of nickel to iron in the concentrate compared to the raw ore.

As may also be seen from the Examples, practice of the present invention may provide nickel concentrates having a nickel content of 10 percent or better together with a total nickel recovery of 75 percent or better.

The present invention can be also used to process very low-grade primary nickel volcanic fragmental rock materials. Fragments of fibrous feldspar, chlorite and leucoxene are found in these materials along with minor quantitite of magnetite. Generally, very fine sulphides occur in the fragments chiefly as pyrite, violarite-polydmite, pentlandite, chalcopyrite, sphalerite and galena.

What is claimed is:

1. A process for recovering nickel from primary rock materials, said primary rock being characterized by a disseminated nickel content of not more than about 0.5 percent by weight, a sulfur to nickel ratio of 1 or less, an iron content of not more than about 10 percent by weight, and the bound nickel therein being present to a substantial extent as nickel sulphide, comprising:
   a. forming a mixture consisting of (i) 100 parts by weight of particles of the rock materials; (ii) 0.75 to 10 parts of alkali metal chloride and (iii) 0.5 to 14 parts of solid coal;
   b. roasting the resulting mixture in a substantially neutral atmosphere at temperatures above 800° C. but less than about 1,100° C. for a period of time sufficient to convert a substantial portion of the nickel values to metallic forms susceptible to recovery by magnetic separation;
   c. cooling the roasted mixture under non-atmospheric conditions; and
   d. subjecting the cooled mixture at least once to magnetic separation, whereby the magnetic fraction is separated as a nickel concentrate.

2. A process according to claim 1 wherein the alkali metal chloride is sodium chloride.

3. The process according to claim 1 wherein the amount of alkali metal chloride is between about ¾ and 5 percent by weight.

4. The process according to claim 1 wherein the amount of solid carbonaceous reducing agent is between about 0.5 and 6 percent by weight.

5. A process according to claim 1 wherein the roasting time is between about 20 minutes and 1½ hours.

6. The process according to claim 1 wherein the solid carbonaceous reducing agent is coal having a particle size between about −20 mesh to −60 mesh.

7. The process according to claim 1 wherein the primary rock material is an ultramafic ore.

8. The process according to claim 7 wherein the ultramafic ore is a peridotite.

9. The process according to claim 1 wherein the primary rock material is a volcanic fragmented rock.

10. The process according to claim 1 wherein the nickel concentrate obtained after magnetic separation has a nickel content (percent by weight) of not less than about 8 percent, said nickel representing not less than about 75 percent of the original nickel content in the untreated rock material.

* * * * *